United States Patent
Ovchinnikov

(10) Patent No.: US 11,208,325 B2
(45) Date of Patent: Dec. 28, 2021

(54) HALOGENOID ACIDS AND SALTS THEREOF

(71) Applicant: Valery Vasilievich Ovchinnikov, Moscow (RU)

(72) Inventor: Valery Vasilievich Ovchinnikov, Moscow (RU)

( * ) Notice: Subject to any disclaimer, the term of this patent is extended or adjusted under 35 U.S.C. 154(b) by 0 days.

(21) Appl. No.: 16/471,931

(22) PCT Filed: Oct. 23, 2017

(86) PCT No.: PCT/RU2017/000773
§ 371 (c)(1),
(2) Date: Jun. 20, 2019

(87) PCT Pub. No.: WO2019/083386
PCT Pub. Date: May 2, 2019

(65) Prior Publication Data
US 2019/0330062 A1  Oct. 31, 2019

(51) Int. Cl.
*C01B 21/084* (2006.01)
*C01B 17/46* (2006.01)

(52) U.S. Cl.
CPC .......... *C01B 21/0842* (2013.01); *C01B 17/46* (2013.01)

(58) Field of Classification Search
CPC ....... C01B 21/0842; C01B 7/00; C01B 11/00; C01B 21/20–50; C01B 17/46–466; C01B 25/16; C01B 25/18
See application file for complete search history.

(56) References Cited

U.S. PATENT DOCUMENTS

| 2,053,269 A | 9/1936 | Dietrich et al. |
| 3,338,960 A | 8/1967 | Mador et al. |
| 2016/0079608 A1 | 3/2016 | Choi et al. |

FOREIGN PATENT DOCUMENTS

SU  1735268 A1  5/1992

OTHER PUBLICATIONS

Sugama et al., "Decomposition of Chrysotile Asbestos by Fluorosulfonic Acid," Ind. Eng. Chem. Res. 1998, 37, 79-88. (Year: 1998).*
Solkan et al., "Decomposition of Chrysotile Asbestos by Fluorosulfonic Acid," Kinetics and Catalysis 2013 vol. 54, No. 3, 297-302. (Year: 2013).*
Cremlyn, R. J. "Chlorosulfonic Acid: A Versatile Reagent," The Royal Society of Chemistry, 2002, pp. 1-6. (Year: 2002).*
Mitchell, Robert A. "Kinetics of hydrolysis of PCl5 in situ as evaluated from the partial hydrolysis products formed in [18O] water", J. Chem. Soc., Dalton Trans., 1997, pp. 1069-1073. (Year: 1997).*
International Search Report in International Application No. PCT/RU2017/000773 and an English Translation of the ISR.
Written Opinion of the International Search Authority in International Application No. PCT/RU2017/000773.

* cited by examiner

*Primary Examiner* — Anthony J Zimmer
(74) *Attorney, Agent, or Firm* — Muncy, Geissler, Olds & Lowe, P.C.

(57) ABSTRACT

The invention relates to the field of inorganic chemistry and presents a new class of acids and their salts, in particular, a class of halogenoid acids with a general formula $H_mXO_{(V+m-n)/2}Ha_n$, where X is a non-metal of group 4, 5 or 6 of the periodic table of elements, V is its valence in the compound, Ha is a halogen, which may find application in chemical treatment of materials, as a part of fertilizers or insecticides in agriculture, in medicine, etc.
In particular, the object of the invention is a fluoro-nitric acid of the formula $H_2NO_3F$ with the structural formula

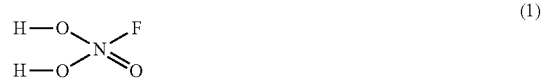

(1)

In particular, the object of the invention is a chloro-nitric acid of the formula $H_2NO_3Cl$ with the structural formula

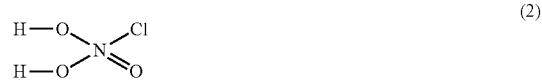

(2)

In particular, the object of the invention is a sulfuro-chlorous acid of the formula $H_2SO_3Cl_2$ with the structural formula

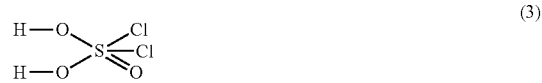

(3)

4 Claims, No Drawings

HALOGENOID ACIDS AND SALTS THEREOF

RELATED APPLICATION

This application is an application under 35 U.S.C. 371 of International Application No. PCT/RU2017/000773 filed on 23 Oct. 2017, the disclosure of which is incorporated in its entirety by reference herein.

The invention relates to the field of inorganic chemistry and represents a new class of acids and their salts, more specifically, a class of halogenoid acids that can be used in the processing of metals, semiconductors and their compounds with other substances.

In particular, compounds of halogenoid acids can be used for amorphization of oxide films on the surface of metals or semiconductors by doping oxide films with halogens in the course of anodic oxidation.

With the growth of amorphous oxide films on the surface of materials by anodic oxidation, for example, on the surface of gallium arsenide, upon reaching a certain thickness of the film, a crystallization process develops therein. Gallium oxide crystals forming at the semiconductor interface lead to deterioration of the electrical characteristics of the interface, and subsequently to the breakdown of the oxide film consisting of gallium and arsenic oxides. Introduction of impurities of different nature and valence, in particular, halogens, in a film, contributes to their amorphization and slows down the process of growth of gallium oxide crystals.

However, doping with halogens cannot be done in the process of anodic oxidation due to the fact that halogen ions increase the conductivity of the oxide film, lead to its breakdown and, ultimately, to local etching of metal or semiconductor (pitting or etching, depending on the concentration of halogen ions).

For doping of oxide layers with halogens while preventing the breakdown of the oxide film in the course of anodic oxidation, this invention suggests to introduce ions of halogens in a bound form, as a part of a complex anion, in the electrolyte, and to this effect, to use new, previously unknown halogenoid acids and their salts.

The objective of the invention is halogenoid acids with a general formula $H_mXO_{(V+m-n)/2}Ha_n$, (where X is a non-metal of group 4, 5 or 6 of the periodic table of elements, V is its valence in the compound, Ha is a halogen) and their salts.

In particular, the objective of the invention is fluoro-nitric acid with the formula $H_2NO_3F$, its structural formula being as follows:

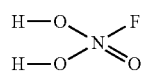

(1)

In particular, the objective of the invention is chloro-nitric acid with the formula $H_2NO_3Cl$, its structural formula being as follows:

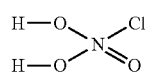

(2)

In particular, the objective of the invention is sulfuro-chlorous acid with the formula $H_2SO_3Cl_2$, its structural formula being as follows:

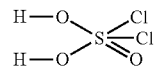

(3)

Neither the claimed compounds, nor their properties or method of obtaining are described in literature.

The essence of the invention is as follows.

In the course of anodizing of metals or semiconductors in melts of salts containing salts of halogenoid acids, halogens are in the bound (inactive) state and therefore do not prevent the growth of the oxide film. At the same time, halogens making part of a complex anion are captured by the oxide film and are included therein, changing the properties of the films and contributing to their amorphization.

The claimed acids are obtained by substituting one or more "non-metal-oxygen" bonds with "non-metal-halogen" bonds in the molecule of the acid. Salts of acids are obtained by a standard method, for example, by interacting with a corresponding alkali or carbonate.

Specific methods of obtaining the acids are chosen individually in each particular case. E.g., the fluoro-nitric acid of the above formula (1) is obtained by composing a mixture of salts:

anhydrous lithium fluoride LiF—0.1÷2.7 weight % anhydrous lithium nitrate $LiNO_3$—remaining up to 100 weight %,

Then the resulting mixture is heated to a temperature of 253-400° C., homogenized, cooled to room temperature and dissolved in water, whereupon orthophosphoric acid is added to the resulting aqueous solution in an amount necessary to remove lithium from the solution (precipitation of lithium phosphate), and then the mixture of acids is separated from the filtrate (precipitated lithium phosphate) and the resulting fluoro-nitric and nitric acids are separated.

The melting temperature of the mixture of salts has a lower limit determined by the melting temperature of lithium nitrate (253° C.), while at the melting temperature of more than 400° C. the decomposition of lithium nitrate begins.

With the content of anhydrous lithium fluoride in the source mixture of salts above 2.7 weight % (eutectic composition), after fusion the mixture contains excessive lithium fluoride, which in further operations leads to the formation of hydrofluoric acid; therefore exceeding the concentration of lithium fluoride above 2.7 weight % is inexpedient. With the content of anhydrous lithium fluoride in the source mixture of salts below 0.1 weight %, its low concentration makes it difficult to purify the final product.

With the concentration of anhydrous lithium fluoride below 2.7 weight %, there are no fluorine ions in the melt. This is confirmed by the fact that at anodic oxidation of iron or semiconductor compounds, such as gallium arsenide, etching of the surface (a process sensitive even to traces of fluorine ions) is only observed at concentrations of anhydrous lithium fluoride in the source mixture of salts above 2.7 weight %. This indicates that in a melt of salts, at a low concentration, fluorine is found in a bound state.

The data of studies of a cooled melt of salts by the method of electron spectroscopy for chemical analysis (ESCA) indicate the presence of two types of chemical bonds in fluorine with energies of 684.4 eV and 686.9 eV, one of which corresponds to the Li—F bond, and the other to the N—F bond.

The chloro-nitric acid of the above formula (2) is obtained by composing a mixture of salts:

anhydrous lithium chloride LiCl—0.1÷1 weight % anhydrous lithium nitrate LiNO$_3$—remaining up to 100 weight %, then the resulting mixture is heated to a temperature of 253÷400° C., homogenized, cooled to room temperature and dissolved in water, whereupon orthophosphoric acid is added to the resulting aqueous solution in an amount necessary to remove lithium from the solution (precipitation of lithium phosphate), and then the mixture of acids is separated from the filtrate (precipitated lithium phosphate) and the resulting chloro-nitric and nitric acids are separated.

The melting temperature of the mixture of salts has a lower limit determined by the melting temperature of lithium nitrate (253° C.), while at the melting temperature of more than 400° C. the decomposition of lithium nitrate begins.

With the content of anhydrous lithium chloride in the source mixture of salts above 1 weight % (eutectic composition), after fusion the mixture contains excessive lithium chloride, which in further operations leads to the formation of hydrochloric acid; therefore, exceeding the concentration of lithium chloride above 1 weight % is inexpedient. With the content of anhydrous lithium chloride in the source mixture of salts below 0.1 weight %, its low concentration makes it difficult to purify the final product.

With the concentration of anhydrous lithium chloride below 1 weight %, there are no chlorine ions in the melt. This is indirectly confirmed by the fact that at anodic oxidation of iron or semiconductor compounds, such as gallium arsenide, etching of the surface (a process sensitive even to traces of chlorine ions) is only observed at concentrations of anhydrous lithium chloride in the source mixture of salts above 1 weight %. This indicates that in a melt of salts, at a low concentration, chlorine is found in a bound state.

The substance of the invention is explained by non-limiting examples of its implementation.

EXAMPLE 1

To obtain fluoro-nitric acid as a source product, a mixture is prepared of 97.3 g (1.41 mol) of anhydrous lithium nitrate and 2.7 g (0.104 mol) of anhydrous lithium fluoride. The resulting mixture is fused at a temperature of 350° C. and kept at this temperature for 15-20 minutes until complete homogenization, then cooled down to room temperature and dissolved in 100 ml of distilled water. 40.5 ml of 85% solution of orthophosphoric acid is added to the resulting solution for the formation of poorly soluble lithium phosphate. The precipitate is filtered and a solution containing a mixture of nitric acid and fluoro-nitric acids, with traces of orthophosphoric acid, is obtained.

EXAMPLE 2

To obtain chloro-nitric acid as a source product, a mixture is prepared of 99 g (1.435 mol) of anhydrous lithium nitrate and 1 g (0.0235 mol) of anhydrous lithium chloride. The resulting mixture is fused at a temperature of 350° C. and kept at this temperature for 15-20 minutes until complete homogenization, then cooled down to room temperature and dissolved in 100 ml of distilled water. 39 ml of 85% solution of orthophosphoric acid is added to the resulting solution for the formation of poorly soluble lithium phosphate. The precipitate is filtered and a solution containing a mixture of nitric acid and chloro-nitric acids, with traces of orthophosphoric acid, is obtained.

Therefore, the claimed acids and their salts enable to dope oxide films on the surface of metals or semiconductors, as these are in the course of anodic oxidation, with halogens, which was previously inaccessible.

Doping of oxide films is the non-limiting field of application of the invention. The claimed acids and their salts may also be used in other fields of activities, e.g., in chemical treatment of materials, as a part of fertilizers or insecticides in agriculture, in medicine, etc.

The invention claimed is:

1. A Halogenoid acid of the general formula $H_2NO_3Ha$ or a salt thereof, Ha is a halogen.

2. The acid of claim 1 which is fluoro-nitric acid with the formula $H_2NO_3F$, its structural formula being as follows:

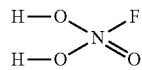

or a salt thereof.

3. The acid of claim 1 which is chloro-nitric acid with the formula $H_2NO_3Cl$, its structural formula being as follows

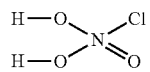

or a salt thereof.

4. A sulfuro-chlorous acid with the formula $H_2SO_3Cl_2$, its structural formula being as follows

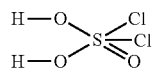

or a salt thereof.

* * * * *